United States Patent [19]

Heywood

[11] Patent Number: 4,707,074

[45] Date of Patent: Nov. 17, 1987

[54] OPTICAL FIBRE CABLES

[75] Inventor: Clifford Heywood, Essex, England

[73] Assignee: Telephone Cables Limited, England

[21] Appl. No.: 744,473

[22] Filed: Jun. 13, 1985

[30] Foreign Application Priority Data

Jun. 19, 1984 [GB] United Kingdom ............... 8415638
Aug. 24, 1984 [GB] United Kingdom ............... 8421480

[51] Int. Cl.⁴ ............................................. G02B 6/44
[52] U.S. Cl. ............................................. 350/96.23
[58] Field of Search ................................. 350/96.23

[56] References Cited

U.S. PATENT DOCUMENTS 4,038,489  7/1977  Stenson et al. .................. 350/96.23

FOREIGN PATENT DOCUMENTS 0020036  1/1980  European Pat. Off. .
8236506  8/1984  United Kingdom .

*Primary Examiner*—William L. Sikes
*Assistant Examiner*—Akm E. Ullah
*Attorney, Agent, or Firm*—Kirschstein, Kirschstein, Ottinger & Israel

[57] ABSTRACT

An optical fibre cable has a plurality of longitudinally extending closed channels (6) formed in a protective cover, and each bounded by part of the outer wall (5) of the cover, wherein said wall (5) is formed with at least one region (8) of reduced thickness extending along a channel (6) so as to form a line of weakness which facilitates penetration of the cover to give access to the optical fibre (7) or fibres within the channel (6). A rip cord (9) may be embedded in the wall (5) so that by pulling the rip cord (9) a slit (10) is formed in the wall (8).

6 Claims, 2 Drawing Figures

OPTICAL FIBRE CABLES

BACKGROUND OF THE INVENTION

1. Field of the Invention

This invention relates to optical fibre cables, that is to say cables having one or more optical fibres accommodated wthin a protective cover, and relates especially to such cables of the kind in which the cover comprises a central core, an outer wall surrounding the core and a plurality of longitudinally extending partitions between the core and the outer wall to define betwen them a plurality of longitudinally extending channels at least one of which provides accommodation for one or more of said optical fibres.

2. Description of the Related Art

In order to provide access to optical fibres within the channels, for example for repair, jointing and/or replacement of parts of the fibres, such cables have hitherto been provided with slits in the protective cover. However this has proved generally unsatisfactory as it has meant that the slits need to be provided along the whole length of the cable, and for each channel of the cable. Moreover in cases where the channels are required to contain a water-repellent medium, the presence of such slits makes it difficult to retain the medium in the channels.

SUMMARY OF THE INVENTION

In accordance with the present invention, in an optical fibre cable of the kind referred to, the wall of the cover is formed with at least one region of reduced thickness extending longitudinally along a said channel thereby forming a line of weakness which facilitates penetration of the cover to give access to the channel.

The presence of a region of reduced thickness in the cover wall facilitates the formation of a slit in the cover in any desired position along the resective channel, whilst keeping the remainder of the channel, and the other channels, closed. This provides access to the interior of the channel at that position, and facilitates the removal from the formed cable of a fibre without the need to cut into the outer wall of the respective channel with a knife or like tool.

Thus access to a channel at an end region of a length of cable can readily be obtained by tearing along such a line of weakness associated with the channel from the cable end. A rip cord may be located adjacent the inner surface of a region of reduced thickness in order to facilitate this.

By making the region of reduced thickness sufficiently thin a slit may be formed in the cable wall by inward pressure on the wall immediately adjacent one side of the region.

Alternatively a slit could be formed by the insertion of a wedge, preferably of a plastics material, through the cable wall at a region of reduced thickness. This could be advantageous if the wedge were provided with an opening through which fibres contained within the respective channel could be brought out.

In an alternative embodiment of a cable according to the invention, two such lines of weakness may be provided so that a complete strip can be readily removed from the rest of the cover to leave a slot providing access to the channel.

The cover is preferably formed as an extrusion of thermoplastics material, the optical fibre or fibres being introduced into the cover during the extrusion process. A rip cord or cords, where provided, may also be incorporated into the cover during this process.

The central core of the cable preferably contains a strength member, and the channels, may if desired, contain a water-repellent or other material in a semi-solid or powdered form.

Preferably the outer wall of the cover has a said region of reduced thickness, with or without a rip cord, extending longitudinally over each of the channels.

BRIEF DESCRIPTION OF THE DRAWINGS

Two embodiments of an optical fibre cable in accordance with the invention, and their methods of manufacture will now be described by way of example with reference to the accompanying drawings, wherein.

DETAILED DESCRIPTION OF THE PREFERRED EMBODIMENTS

Figure 1:
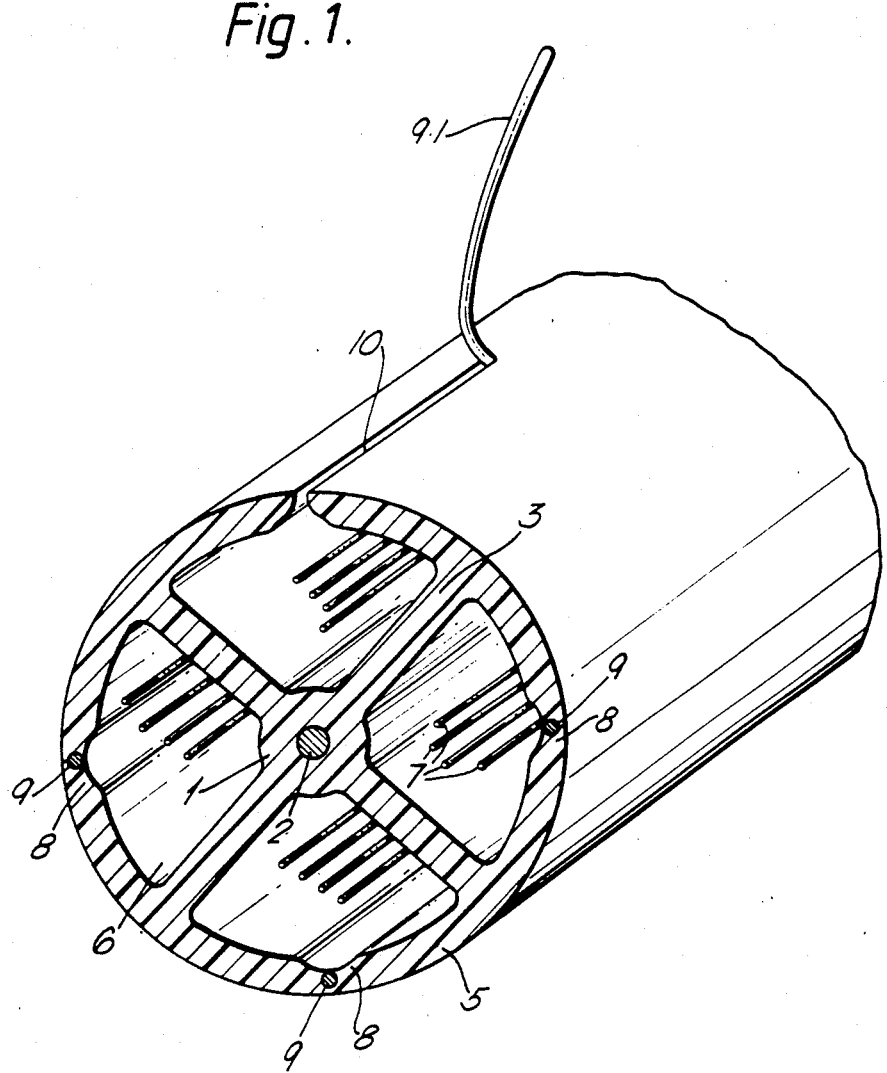
FIGS. 1 and 2 are ach a perspective view of part of the cable.

Thus the cable shown in FIG. 1 comprises an extruded cover of thermoplastics material having an inner core 1 surrounding a central strength member 2, a plurality of fins 3 (in the illustrated example four) and an outer wall 5. The core 1, fins 3 and outer wall 5 are formed integrally with one another and define between them a plurality of closed channels 6.

Each of the channels 6 contains one or more optical fibres 7, and the wall of the cover is formed with a longitudinally extending region 8 of reduced wall thickness over the central part of each channel. A rip cord 9 of thin Terylene or the like is embedded in the wall of the cover at each region of reduced wall thickness, close to its inner surface, so that a slit 10 may be formed in the wall by pulling the rip cord 9 outwards as at 9.1. The rip cords 9 may be only partially embedded in the material of the wall if desired.

During manufacture of the cable, the central strength member 2 is fed through a die, and the cover is extruded around it, the die being arranged to form the required channels 6 in the cover into which are fed the optical fibres 7 through flexible narrow-bore tubes, as described in co-pending British patent application No. 8236506, now U.K. Pat. No. 2,134,842. The die is also arranged to form the longitudinal regions 8 of thinner diameter in the outer wall 5 of the cover centrally over the channels 6. At the same time rip cords 9 are fed through the die so that they become embedded in the thinner region 8 of the wall closely adjacent the inner surface.

In addition, as it emerges from the die and whilst it is still soft, the cover is oscillated about its axis, imparting to the fibres 7 a degree of overfeed so that in the formed cable they are longer than the cover and are loosely accommodated in the respective channels.

It will be seen that the outer wall of the cover is initially formed complete without slits or perforations so that the channels are able to contain a water-repellent medium without leakage, if such a filling is required.

Nevertheless pulling a rip cord 9 will reveal the fibres contained within the respective channel 6 at the end of the cable or at any predetermined point along the channel.

The cover may be given a second sheath, either in tandem or as a separate process, which will not adhere to the cover material, thereby enabling the cover to be readily revealed for stipping purposes.

If desired, each region of the cover wall which contains a rip cord may be formed with a pair of indented regions lying one on each side of the rip cord so that pulling of the rip cord will effectively tear a strip of material from the cover wall to leave a slit of the length required to provide access to the fibre or fibres in the respective channel.

In some cases the rip cords 9 may be omitted, the presence of the regions 8 of reduced thickness being sufficently thin to permit the cover to be readily broken open, either by tearing along a region from an end of the cable or by pressing on one side of the outer wall of a channel immediately adjacent a said region. Penetration of a channel may also be a required position along a region of reduced thickness, the member preferably being of plastics material to avoid damaging any fibres within the channel.

Figure 2:
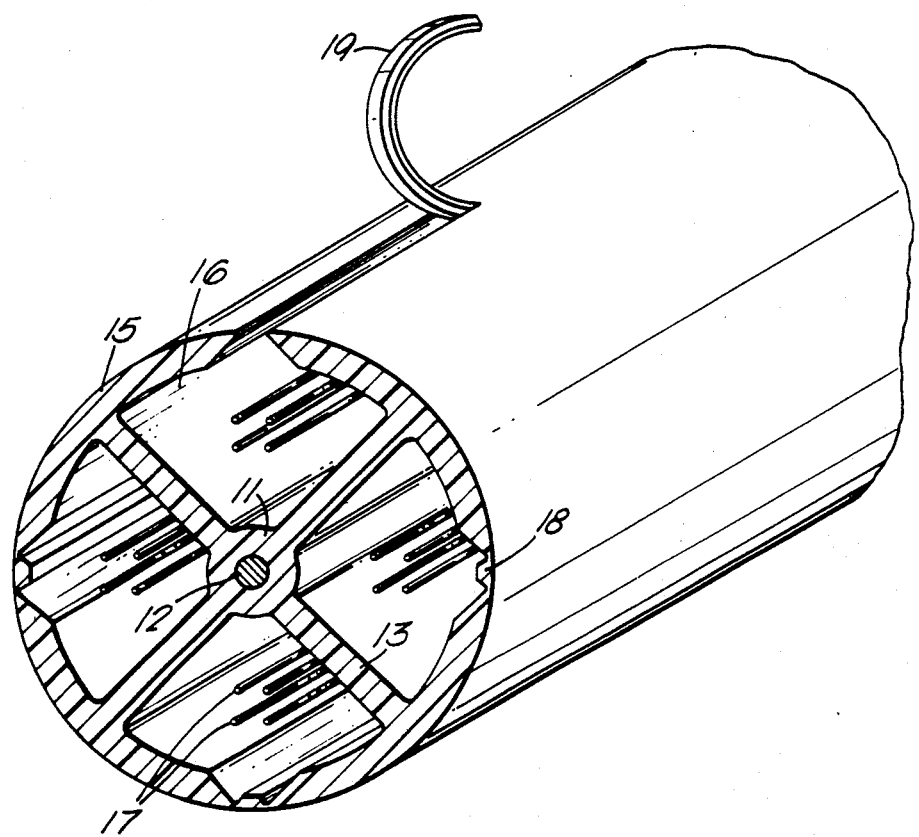

A second embodiment of an optical cable according to the invention is shown in FIG. 2 where the cable comprises an extruded former having a central core portion 11 surrounding a central strength member 12, a plurality of fins 13 (in the illustrated example four) and a cover 15. The core, fins and cover are integral with each other and define longitudinal channels 16 between them.

During manufacture, as the former is extruded around the strength member 12, optical fibres 17 are fed onto the channels 16. The channels are oscillated as this takes place, imparting to the fibres an overfeed so that the fibres are longer than the channelled former and each fibre is loosely accommodated in its channel so that it is free to move within it.

As the extrusion process takes place each section of the cover 15 having a channel is formed with a thinned section 18 3mm wide, or whichever width is required, having at each edge a very thin area which when pulled by hand will tear away from the main cover as a strip 19 to leave a slot in each section of whatever length is required.

The former, before removal of the tear away portion, can be made whole without perforations so that it will contain a filling material such as a water-repellent or water-blocking medium without leakage if such cables are required to be fully filled to prevent water ingress.

The strips 19 when torn away will reveal the fibres at any predetermined point, or at the end of the cable for jointing or other access requirements.

The whole may be given a second sheath in tandem or as a secondary separate process, which will not adhere to the first extrudate giving easy stripability.

I claim:

1. An optical cable including a central core, an outer wall surrounding the core and a plurality of longitudinally extending partitions between the core and the outer wall to define between them a plurality of longitudinally extending channels at least one of which provides accommodation for one or more optical fibres, comprising: at least one region of reduced thickness formed in said outer wall between two adjacent partitions and extending longitudinally along and over at least one channel thereby forming a line of weakness which facilitates penetration of said outer wall to give access to said at least one channel between said two adjacent partitions.

2. An optical cable according to claim 1 wherein a region of reduced thickness is provided extending longitudinally along and over each of said channels between each two adjacent partitions.

3. An optical cable according to claim 1 wherein two such regions of reduced thickness are provided extending longitudinally along and over said at least one channel between said two adjacent partitions, the two regions defining a strip which, in use, may be pulled away from the rest of the outer wall to leave a slot in the outer wall providing access to said at least one channel.

4. An optical cable according to claim 1 wherein said central core, outer wall and partitions are formed in one piece as an extrusion of thermoplastics material.

5. An optical cable according to claim 1 wherein said central core contains a strength member.

6. An optical cable according to claim 1 wherein at least one of said channels contains a water-repellent medium.

* * * * *